(12) United States Patent
Czyżewski et al.

(10) Patent No.: US 8,588,404 B2
(45) Date of Patent: Nov. 19, 2013

(54) METHOD AND APPARATUS FOR ACOUSTIC ECHO CANCELLATION IN VOIP TERMINAL

(75) Inventors: Andrzej Czyżewski, Gdynia (PL); Grzegorz Szwoch, Gdansk (PL)

(73) Assignee: Politechnika Gdanska, Gdansk (PL)

( * ) Notice: Subject to any disclaimer, the term of this patent is extended or adjusted under 35 U.S.C. 154(b) by 456 days.

(21) Appl. No.: 12/735,941

(22) PCT Filed: Jun. 30, 2008

(86) PCT No.: PCT/PL2008/000048
§ 371 (c)(1),
(2), (4) Date: Aug. 26, 2010

(87) PCT Pub. No.: WO2009/110809
PCT Pub. Date: Sep. 11, 2009

(65) Prior Publication Data
US 2011/0002458 A1    Jan. 6, 2011

(30) Foreign Application Priority Data

Mar. 6, 2008  (PL) .......................................... 384616

(51) Int. Cl.
*H04M 9/08* (2006.01)
(52) U.S. Cl.
USPC ................................ 379/406.08; 379/406.14
(58) Field of Classification Search
USPC .............................. 379/406.01–406.1, 406.14
See application file for complete search history.

(56) References Cited

U.S. PATENT DOCUMENTS

| | | | | |
|---|---|---|---|---|
| 4,609,787 A | * | 9/1986 | Horna | 379/406.08 |
| 5,172,416 A | * | 12/1992 | Allie et al. | 381/71.11 |
| 5,463,618 A | * | 10/1995 | Furukawa et al. | 370/290 |
| 5,631,900 A | * | 5/1997 | McCaslin et al. | 370/287 |
| 6,212,273 B1 | * | 4/2001 | Hemkumar et al. | 379/406.08 |
| 6,868,158 B2 | * | 3/2005 | Takahashi et al. | 379/406.04 |
| 7,099,458 B2 | * | 8/2006 | Piket et al. | 379/406.05 |
| 7,577,248 B2 | * | 8/2009 | McCree | 379/406.08 |
| 7,764,783 B1 | * | 7/2010 | Pai et al. | 379/406.08 |
| 2002/0041678 A1 | * | 4/2002 | Basurg-Ertem et al. | 379/406.01 |

(Continued)

*Primary Examiner* — Simon Sing
(74) *Attorney, Agent, or Firm* — Horst M. Kasper

(57) ABSTRACT

A method of acoustic echo cancellation in the VoIP terminal using processing of the far-end signal with the digital adaptive filter in order to obtain the echo estimate that is subtracted from the microphone signal in which the far-end signal, before it is converted to the analog form and passed to the loudspeaker (4), is marked by embedding an encoded digital signature obtained from the signature generator (14) and then detection of the digital signature is performed in the signal collected by the microphone (7) and converted to digital form, depending on the result of the digital signature detection, adaptation of the digital adaptive filter (9) is resumed or stopped. A circuit for acoustic echo cancellation in VoIP terminal contains the digital adaptive filter with the control block situated between the far-end speech signal path and the near-end speech signal path, and the double-talk detector (11) that comprises the signature generator (14) connected by the signature encoder (15) to the signature embedding block (16) that is situated between the speech decoder (2) and the digital-to-analog converter (3) in the far-end speech signal path. The signature generator (14) is also connected to the signature decoder (17) which is connected to the output of the analog-to-digital converter (8) in the near-end speech signal path and the output of the signature decoder (17) is connected by the decision block (18) to the control block (10) of the digital adaptive filter (9).

4 Claims, 1 Drawing Sheet

(56) References Cited

U.S. PATENT DOCUMENTS

| | | | |
|---|---|---|---|
| 2003/0133565 A1* | 7/2003 | Chang et al. | 379/406.01 |
| 2003/0235244 A1* | 12/2003 | Pessoa et al. | 375/232 |
| 2004/0086109 A1* | 5/2004 | Takada | 379/406.08 |
| 2004/0151303 A1* | 8/2004 | Park et al. | 379/406.01 |
| 2007/0121925 A1* | 5/2007 | Cruz-Zeno et al. | 379/406.01 |

* cited by examiner

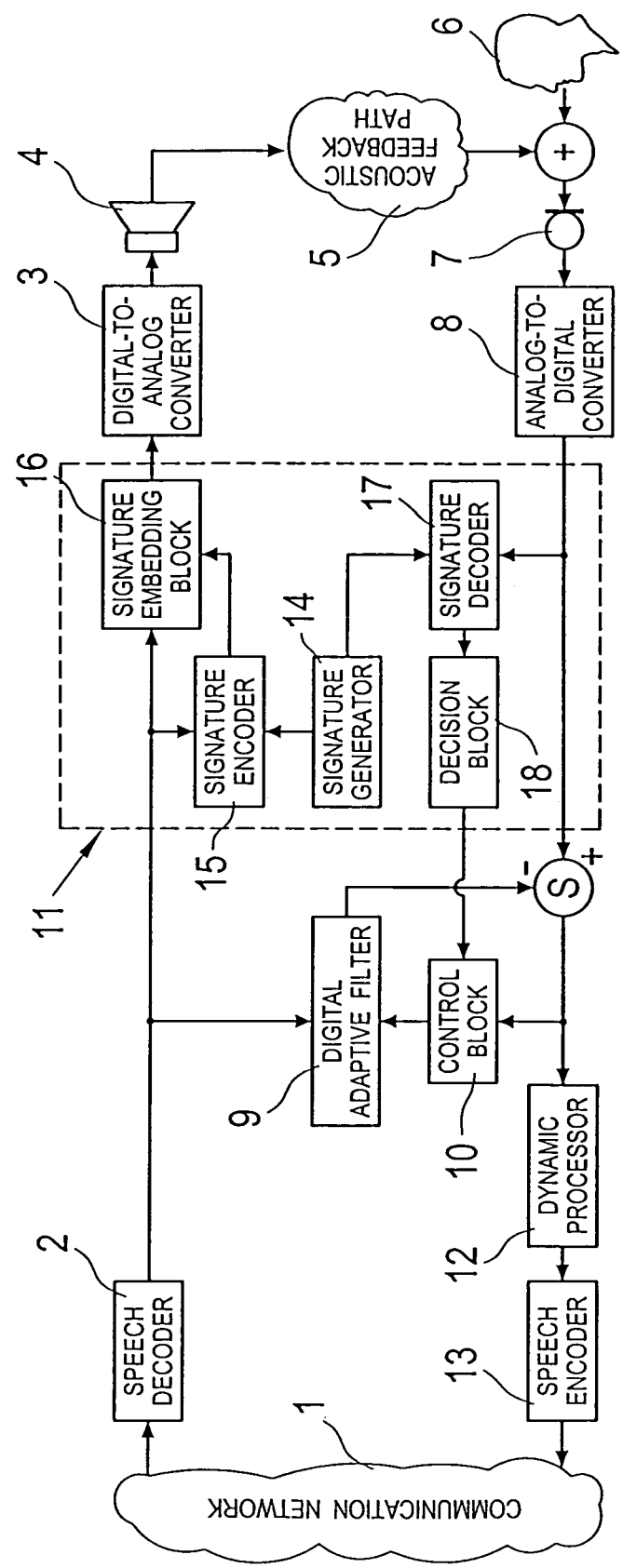

METHOD AND APPARATUS FOR ACOUSTIC ECHO CANCELLATION IN VOIP TERMINAL

BACKGROUND OF THE INVENTION (1) Field of the Invention

The subject of the invention is a method and a circuit for acoustic echo cancellation in VoIP terminal. The solution is intended for various types of client terminals of Internet voice communication systems, especially when the client uses a loudspeaker instead of a headset.

(2) Description of Related Art Including Information Disclosed Under 37 CFR 1.97 and 1.98

A development of voice transmission technologies that make use of computer networks, described using a term "Voice over IP (VoIP) telephony" is a source of numerous novel hardware and software solutions for effective transmission of the speech signal in the Internet, providing good quality of the signal. The clients of the VoIP systems are encouraged to use either a dedicated terminal, resembling the traditional telephone apparatus, or a headset consisting of headphones and a microphone. In some cases, because of various reasons, the clients need to use loudspeakers which often leads to decreased quality of the conversation due to the acoustic echo effect. The acoustic echo occurs if the far-end speech signal from the loudspeaker is collected by the microphone that should only record the near-end speech. As a result, the speech signal returns to the original speaker who hears his own voice, delayed and distorted, because the microphone at the client terminal collects not only the near speech, but also the undesired, distorted echo signal. In order to eliminate this effect, various signal processing algorithms and devices are used in order to prevent the echo signal from returning to the sender, without introducing considerable transmission delay, by means of removing the echo from the signal collected by the microphone and transmitting only the desired near-end speech signal.

A number of methods and devices for acoustic echo cancellation by means of an adaptive digital filtering is known. Processing the far-end speech signal by the adaptive filter results in obtaining an echo estimate which is then subtracted from the microphone signal. The result of this operation is used for filter adaptation. After the adaptation process is finished, the echo estimate from the adaptive filter output simulates the real acoustic echo and it may be subtracted from the microphone signal, resulting in echo cancellation. In order to achieve an accurate and efficient echo cancellation using the solutions based on adaptive filters, the filter adaptation process must not performed if a double-talk occurs, i.e. the microphone connected to the client terminal collects both near-end speech and, at the same time, echo signal from the far end. This requirement is necessary in order to prevent detuning of the filter and distortion of the processed signal. A number of methods and devices for double-talk detection, differing in complexity and accuracy, is known.

One known method of adaptive acoustic echo cancellation described in U.S. Pat. No. 4,894,820 uses the double-talk detection based on additional adaptive filter for estimation of the difference between the processed and the microphone signal, by means of comparing the statistical parameters of the signal. Another known solution described in U.S. Pat. No. 6,608,897 uses a variable filter adaptation step, depending on the difference between the processed signal, after echo removal, and the microphone signal. Yet another known double-talk detection method described in U.S. Pat. No. 6,792,107, suitable for implementation in the VoIP system, is based on calculation of a correlation between the far-end signal and the microphone signal. The correlation is a measure of similarity of the signals. If the correlation is low, a double-talk may be detected. Additionally, a dynamic threshold for the detection is determined from the analysis of both signals. Similarly, the invention described in U.S. Pat. No. 6,192,126 proposes double-talk detection by means of analysis of the signal energy in several frequency bands.

In the solution disclosed in U.S. Pat. No. 4,894,820, the acoustic echo canceller includes the digital adaptive filter and the so-called Geigel double-talk detector which compares the amplitude or energy of the microphone and the far-end signal. The international application WO98/43368 describes the device for echo cancellation containing the adaptive filter in parallel connection with the double-talk detector to which two nonlinear processors are connected, together with the noise generator, delay estimator, noise power estimator and two tone switches. Another acoustic echo canceller described in patent application WO98/51066, in addition to the adaptive filter, contains at least one additional microphone, another adaptive filter and the additional filters.

Known solutions for acoustic echo cancellation that provide high accuracy are based on complex algorithms. As a consequence, the double-talk detection requires more time and delays are introduced to the signal transmission. On the contrary, other solutions that do not introduce considerable delays, do not provide satisfactory accuracy of echo cancellation. Therefore, none of these solutions are optimal for application in VoIP terminals having limited resources.

SUMMARY OF THE INVENTION

1. Purposes of the Invention

It is a purpose of the invention to furnish a device for improved acoustic echo cancellation in a VoIP terminal.

2. Brief Description of the Invention

A method of acoustic echo cancellation in the VoIP terminal as proposed in the invention in which the far-end speech signal is processed with the digital adaptive filter in order to obtain the echo estimate that is subtracted from the microphone signal, the result is used for adaptation of the digital adaptive filter and the filter adaptation process is stopped while the double-talk is present, is characterized by marking the digital far-end speech signal, before it is converted to the analog form and passed to the loudspeaker, by means of adding an encoded digital signature obtained from the signature generator, to the signal, and then a detection of the digital signature is performed in the signal collected by the microphone and converted to digital form and depending on detection of presence or absence of the digital signature in the signal, adaptation of the digital adaptive filter is resumed or stopped.

The digital signature is a sequence of bytes chosen so that the digital signature is suppressed by the near-end speech signal of the terminal user and it is preserved in the far-end speech signal distorted in the acoustic feedback path between the loudspeaker and the microphone.

It is desirable to encode the digital signature by means of adding to the signal being marked a defined number of copies of itself, each having an independently chosen amplitude and delay.

A device for acoustic echo cancellation in the VoIP terminal according to the invention containing the digital adaptive filter with the control block, situated between the far-end speech signal path and the near-end speech signal path, and the double-talk detector, is characterized by the double-talk detector containing the signature generator connected by the signature encoder to the signature embedding block that is situated between a speech decoder and a digital-to-analog converter in the far-end speech signal path. The signature generator is also connected to the signature decoder which is connected to the output of an analog-to-digital converter in the near-end speech signal path and the output of the signature decoder is connected by the decision block to the control block of the digital adaptive filter.

The invention ensures an efficient acoustic echo cancellation without introducing the significant delay to the speech signal transmission which results in a significant increase of quality of service in the speech transmission systems using computer networks.

BRIEF DESCRIPTION OF THE SEVERAL VIEWS OF THE DRAWING(S)

There is shown in:
FIG. 1 a schematic view of a preferred embodiment of the invention.
An example of the realization of the invention is illustrated by the block diagram of the VoIP terminal.

DETAILED DESCRIPTION OF THE INVENTION

A method of acoustic echo cancellation in the VoIP terminal is based on processing the far-end speech signal using the digital adaptive filter 9 in order to obtain the acoustic echo estimate which is then subtracted from the signal collected by the microphone 7 and the resulting signal is used for the adaptation of the digital adaptive filter 9. The process of filter adaptation is stopped when the double-talk is present (signals from both the far-end speaker and the near-end speaker are present at the same time) and the double-talk is detected by the double-talk detector 11. The double-talk detection is performed as follows: a digital far-end speech signal, before it is converted to the analog form and passed to the loudspeaker 4, is marked by adding the encoded digital signature, originating from the signature generator 14, to the far-end speech signal, and then the detection of the signature in the signal collected by the microphone 7 and converted to the digital form, is performed. The digital signature is a defined sequence of bytes chosen so that the digital signature is suppressed by the near-end speech when it is present and the signature is preserved in the analog far-end speech signal distorted by the acoustic feedback path 5 between the loudspeaker 4 and the microphone 7. In order to obtain the signal that is immune to distortions, the digital signature is encoded in a way that a sum of a defined number of scaled and delayed copies of the marked signal form the signature. Therefore, the embedding of the signature in the signal is based on the echo hiding algorithm. In case the signature is not found in the signal collected by the microphone 7, the adaptation of the digital adaptive filter 9 is stopped, and when the signature is found in the signal, the adaptation of the filter is resumed.

The VoIP client terminal is connected to the communication network 1. At the input of the terminal, in the far-end signal path, a speech decoder 2 is situated, to which the digital-to-analog converter 3 and the loudspeaker 4 are connected. The acoustic feedback path 5, shown symbolically in the block diagram, causes a distortion of the acoustic waves emitted by the loudspeaker 4, that are collected by the microphone 7, together with the near-end speech from the terminal user 6. In the near-end signal path, the analog-to-digital converter 8 is connected to the microphone 7 and the output of the analog-to-digital converter 8 is connected to the summation node S to which the output of the digital adaptive filter 9 is also connected. The output of the speech decoder 2 and the output of the control block 10 are connected to the inputs of the digital adaptive filter 9. The input of the control block 10 is connected to the double-talk detector 11 and the output of the summation node S. The output of the summation node S is connected by a dynamic processor 12 and a speech encoder 13 to the input to the communication network 1. The double-talk detector 11 contains the signature generator 14, the signature encoder 15, the signature embedding block 16, the signature decoder 17 and the decision block 18. The output of the signature generator 14 is connected by the signature encoder 15 to the signature embedding block 16 which is situated between the output of the speech decoder 2, connected also to the signature encoder 15, and the input of the digital-to-analog converter 3 in the far-end speech signal path. The output of the signature generator 14 is connected also, by the signature decoder 17, to the decision block 18, output of which is connected to the control block 10 of the digital adaptive filter 9. To the signature decoder 17, the output of the analog-to-digital converter 8 in the near-end speech signal path is also connected.

The digital far-end speech signal is received from the communication network 1, decoded by the speech decoder 2, converted to the analog form by the digital-to-analog converter 3 and passed to the loudspeaker 4. The loudspeaker 4 emits the acoustic waves that are distorted in the acoustic feedback path 5, mainly due to the repetitive wave reflections that cause the reverberation effect. In case that the near-end terminal user 6 is silent, the microphone 7 collects only the distorted far-end speech signal. This signal is converted to the digital form by the analog-to-digital converter 8. In order to prevent this signal from returning to the far-end speaker, the microphone signal is processed and attenuated by the digital adaptive filter 9 and the double-talk detector 11. The digital adaptive filter 9 computes the estimate of the acoustic echo which is then subtracted in the summation node S from the signal containing echo, obtained from the output of the analog-to-digital converter 8. The result of this operation is used by the control block 10 which controls the adaptation of the digital adaptive filter 9. The coefficients of the digital adaptive filter 9 are adapted by the control block 10 and, as a result, the signal from the adaptive filter output is the echo estimate that, after it is subtracted from the microphone signal in the summation node S, forms the output signal without the echo. This procedure is efficient provided that the adaptation of the digital adaptive filter 9 is stopped as soon as the near-end terminal user 6 starts speaking to the microphone 7 and the adaptation is restarted if the near-end terminal user 6 becomes silent again. If this condition is not fulfilled, the digital adaptive filter 9 is detuned which results in deterioration of the quality of the output signal. In order to detect the double-talk, the far-end speech signal obtained from the terminal input, after the signal is processed by the speech decoder 2, is marked by the signature. The signature generator 14 produces a digital signature in a form of sequence of bytes chosen so that it is later possible to detect the presence of the signature in the signal distorted during the transmission of the sound waves between the loudspeaker 4 and the microphone 7. In the signature encoder 15, the digital signature is processed so that the signature is the sum of a defined number of scaled and delayed copies of the marked signal, which results in the signature that spans a wide range of frequencies and that is immune to signal distortions. The signature obtained this way is attenuated and added to the far-end signal in the signature embedding block 16. The signal with the embedded digital signature is passed through the digital-to-analog converter 3 to the loudspeaker 4. The signal collected by the microphone 7 is analyzed in the double-talk detector 11 in order to find whether the signature is present in the signal. If the double-talk is not present, the microphone signal contains only the acoustic echo and the noise. Therefore, it is possible to detect the presence of the signature in this signal. On the contrary, if the double-talk from the near-end terminal user 6 is present, the digital signature in the echo signal is suppressed by the near-end speech and no presence of the signature in the microphone signal is detected. The signature decoder 17 performs pre-processing of the microphone signal, including normalization and synchronization, then detection of the signature is performed. If the signature is detected, it is compared with the signal from the signature generator 14, which was previously inserted into the far-end signal, then the decision block 18 determines whether the signature was present in the microphone signal and switches on or off the control block 10 that controls the digital adaptive filter 9. The decision block 18 provides a binary result: if no signature was detected in the microphone signal, this means that the adaptation of the digital adaptive filter 9 has to be stopped, and if the signature was detected, this means that no double-talk is present in the microphone signal, therefore the adaptation of the digital adaptive filter 9 may be continued or resumed. Regardless of the signature detection result, the acoustic echo estimate obtained from the digital adaptive filter 9, is subtracted from the microphone signal and the resulting signal is further processed by attenuating the residual echo in the dynamic processor 12, then the signal is encoded by the speech encoder 13 and passed to the communication network 1.

Contrary to other known methods and applications of audio watermarking, in the described solution only presence of the signature is detected and not the content of the signature. The expected content of the signature is already known and the detection procedure requires only determination of presence of the signature in the analyzed signal. Therefore, the signature is chosen so that it is possible to detect its presence in a signal that was distorted by introduction of reverberations and noise in the acoustic feedback path 5 between the loudspeaker 4 and the microphone 7, and at the same time, the near-end speech from the terminal user 6 caused suppression of the signature resulting in negative result of the signature detection, which results in accurate detection of the double-talk.

The invention claimed is:

1. A method of acoustic echo cancellation in a VoIP terminal in which a far-end speech signal is processed with a digital adaptive filter in order to obtain a echo estimate that is subtracted from a microphone signal and the result is used for adaptation of the digital adaptive filter, said adaptation is stopped while a double-talk is present characterized in that the far-end speech signal, before it is converted to an analog form and passed to a loudspeaker (4), is marked by adding an encoded digital signature obtained from a signature generator (14) and then detection of the digital signature is performed in a signal collected by a microphone (7) and converted to a digital form and depending on detection of presence or absence of the digital signature in the signal, adaptation of a digital adaptive filter (9) is resumed or stopped, respectively.

2. A method as in claim 1 characterized in that the digital signature is a sequence of bytes chosen so that the digital signature is suppressed by a near-end speech signal of a terminal user (6) and it is preserved in the far-end speech signal distorted in an acoustic feedback path (5) between the loudspeaker (4) and the microphone (7).

3. A method as in claim 2 characterized in that encoding of the digital signature is performed by adding to the signal a defined number of copies of itself each having an independently chosen amplitude and delay.

4. A circuit for acoustic echo cancellation in VoIP terminal containing a digital adaptive filter with a control block situated between a far-end speech signal path and a near-end speech signal path and a double-talk detector characterized in that the double-talk detector (11) comprises a signature generator (14) connected by a signature encoder (15) to a signature embedding block (16) that is situated between a speech decoder (2) and a digital-to-analog converter (3) in the far-end speech signal path, and the signature generator (14) is also connected to a signature decoder (17) which is connected to an output of the analog-to-digital converter (8) in the near-end speech signal path of a terminal user (6) and an output of the signature decoder (17) is connected by a decision block (18) to a control block (10) of a digital adaptive filter (9).

\* \* \* \* \*